United States Patent [19]

Nichols

[11] 4,261,270
[45] Apr. 14, 1981

[54] DIBBLE WHEEL WITH PLURAL FEED

[76] Inventor: William K. Nichols, P.O. Box 18, Corral, Id. 83322

[21] Appl. No.: 71,860

[22] Filed: Sep. 4, 1979

[51] Int. Cl.³ .............................................. A01C 5/04
[52] U.S. Cl. .................................... 111/89; 111/73; 111/80; 111/90; 111/91
[58] Field of Search .................... 111/89, 90, 91, 73, 111/80

[56] References Cited

U.S. PATENT DOCUMENTS

| 520,890 | 6/1894 | Murray |  |
|---|---|---|---|
| 2,543,888 | 3/1951 | Bunch | 111/91 |
| 3,154,030 | 10/1964 | Williams | 111/1 |
| 3,675,601 | 7/1972 | Schlievert | 111/73 X |
| 3,773,224 | 11/1973 | Winslow | 111/80 X |
| 3,982,661 | 9/1976 | Feltrop | 111/89 X |

FOREIGN PATENT DOCUMENTS

| 101052 | 9/1925 | Austria | 111/91 |
|---|---|---|---|
| 1471832 | 3/1967 | France | 111/89 |
| 447495 | 4/1949 | Italy | 111/91 |
| 334358 | 9/1930 | United Kingdom | 111/89 |
| 533349 | 11/1976 | U.S.S.R. | 111/89 |

Primary Examiner—Steven A. Bratlie
Attorney, Agent, or Firm—Graybeal & Uhlir

[57] ABSTRACT

An apparatus for planting seed is disclosed. The apparatus comprises a wheel hub having an annular cam. A ground engaging seed box is spaced apart and rotatable around the cam. A plurality of seed holders are carried by the seed box and are slidable around the cam. Each seed holder extends within the seed box to obtain a seed and is urged out of the seed box to penetrate the ground and deposit the seed in the ground as the seed box rotates around the cam.

8 Claims, 4 Drawing Figures

DIBBLE WHEEL WITH PLURAL FEED

DESCRIPTION

1. Technical Field

This invention relates to seed planting equipment, and more particularly to an apparatus for planting various types of seed as the apparatus engages and moves along the ground.

2. Background Art

The need to plant crop seed at a precise depth within the ground, and with a precise and controllable spacing between adjacent seeds planted along a straight row has long been recognized. This need typically arises with respect to certain crops, such as sugar beets and like crops, which require a precise spacing to realize a maximum growth from the planted seeds. When adjacent seeds are planted too close to each other, the crop will need manual cutting and thinning to produce the maximum growth. The manual labor to do this frequently is expensive and results in a certain amount of crop waste from the loss of the plants which have been cut and thinned.

In the prior art, devices to plant adjacent seeds at precise spacings generally have not been successful. Typical of such devices is one utilizing a rotary type disc in communication with a supply of seed to be planted. The disc contains a plurality of holes around its circumference, and is rotatable over a planter boot in ground engagement. As the disc rotates, a seed is dropped from the supply of seed through the hole in the disc to the planter boot and into the ground. A separate device, apart from the planter boot, subsequently covers the seed. Devices such as these frequently fail to drop seeds into the planter boot, resulting in an excessive space between adjacent seeds, or drops multiple seeds into the planter boot necessitating subsequent crop cutting and thinning.

The present invention provides an apparatus for planting seed to a precise depth and to a precise and controllable spacing between adjacent seeds along straight rows which will not require subsequent crop cutting or thinning. By utilizing a ground engaging seed box rotatable around a wheel hub and carrying a plurality of seed holders each being urgeable out of the seed box for penetrating the ground and depositing a seed in the ground, the disclosed invention ensures that a single seed will be planted each time the ground is penetrated. By adding or removing seed holders from within the seed box, the spacing between adjacent seeds planted in a straight row may be controlled and adjusted. By selecting seed holders having different lengths, the present invention allows the seeds to be planted to a known and precise depth each time a seed holder penetrates the ground.

DISCLOSURE OF THE INVENTION

According to one aspect of the present invention an apparatus for planting seed comprises a wheel hub having an annular cam around the hub. A ground engaging seed box is spaced apart from the wheel hub and the cam and is rotatable around the hub and cam. A plurality of seed holders are carried by the seed box and are slidable on and around the cam. Each seed holder extends within the seed box for obtaining a seed to be planted, and is subsequently urgeable out of the seed box for penetrating the ground and depositing the seed in the ground as the seed box engages the ground and rotates around the wheel hub and the cam.

An object of the present invention is to provide an apparatus for planting seed making better use of the ground's natural nutrients and moisture.

A still further object of the present invention is to provide an apparatus for planting seed to a precise and controllable depth.

A still further object of the present invention is to provide an apparatus which more efficiently utilizes the ground available for planting, thereby raising the crop production per unit of ground.

A still further object of the present invention is to provide an apparatus for planting seed having a precise and controllable spacing between adjacent seeds planted in a row.

A still further object of the present invention is to provide an apparatus for planting seed and fertilizing the same in but a single operation.

A still further object of the present invention is to provide an apparatus for planting seed which is easily adjustable to accomodate different varieties of seed.

The foregoing, and other objects, features, and advantages of the present invention will become more apparent in light of the detailed description of the preferred embodiment thereof set forth hereafter, and illustrated in the accompanying drawings.

BEST MODE OF CARRYING OUT THE INVENTION

Figure 1:
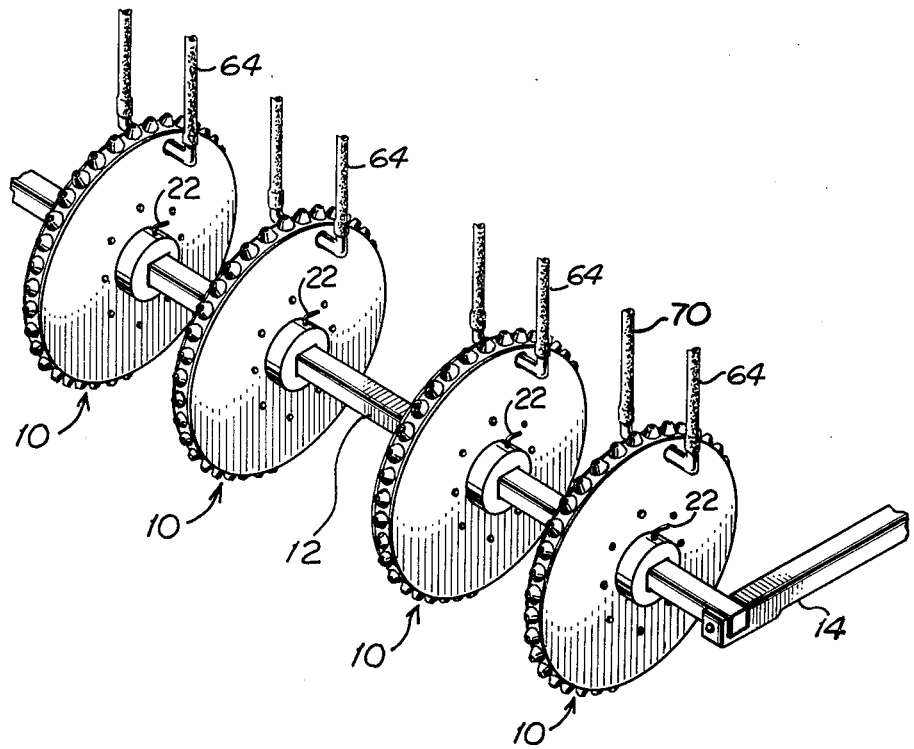
FIG. 1 is a perspective view of a frame movable over the ground carrying a planter bar with a typical embodiment of the present invention attached to the planter bar.
Figure 2:
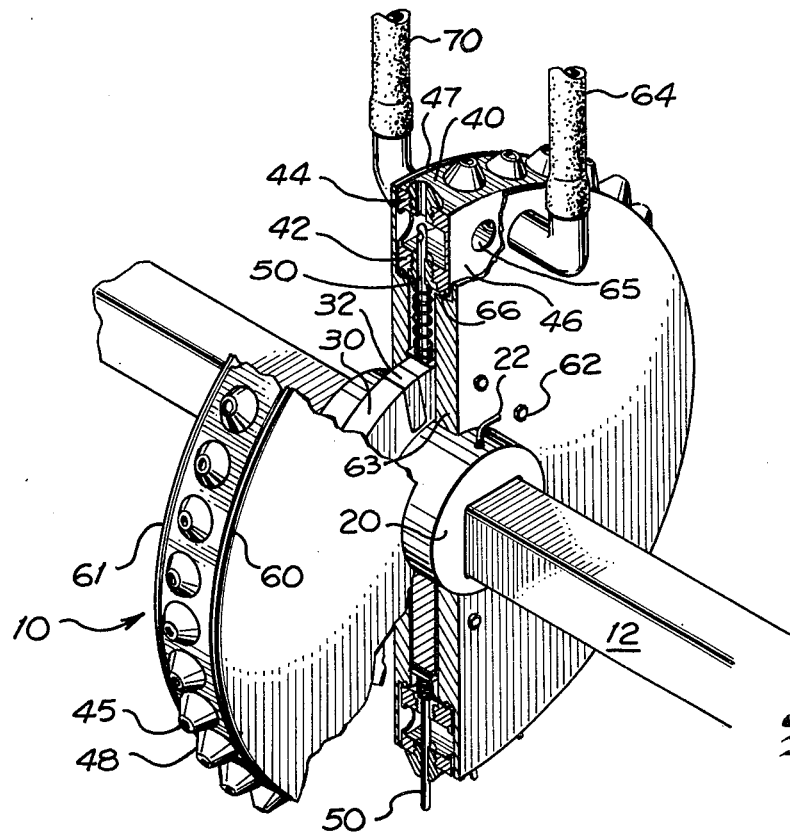
FIG. 2 is a perspective view of a typical embodiment of the present invention with portions shown partially broken away for clarity.

With reference to FIGS. 1, 2, an apparatus for planting seed according to the present invention is shown generally at 10, and is attachable to a planter bar 12 of the type typically carried by a frame 14 movable over the ground by a tractor or similar machine. It is ideally suited to be attached to the planter bar as carried by the grain drill disclosed by W. K. Nichols, U.S. patent application Ser. No. 067,606, filed Aug. 20, 1979. With reference to FIG. 2, the present invention generally comprises a wheel hub 20 slidably attachable to the planter bar. The wheel hub has an annular cam 30 extending generally radially outwardly from the wheel hub. A ground engaging seed box 40 is spaced apart from the wheel hub and the cam, and is rotatable around the hub and the cam. The seed box carries a plurality of seed holders 50 slidable on and around the cam, with each seed holder extending within the seed box to obtain a seed, and being urgeable out of the seed box for penetrating the ground and depositing the seed in the ground as the seed box rotates around the cam and wheel hub. The present invention also includes a means supplying seed to the seed box as the seed box rotates around the cam. Each of these elements, and other details of the present invention will next be discussed in more detail.

The wheel hub 20 has an opening (not shown) permitting the wheel hub to be easily attachable to a planter bar of the type typically carried by a frame movable over the ground. A means 22 on the planter bar, such as a plurality of set screws or the like, is radially extendable through the wheel hub into the opening to engage the planter bar and prevent undesirable lateral movement of the wheel hub along the planter bar. In this manner, when a plurality of the seed planting apparatuses according to the present invention are attached to a planter bar, the spacing between adjacent wheel hubs easily can be adjusted to control the spacing between adjacent rows of seeds planted. For example, it has been found that when planting beans or sugar beets, a spacing between adjacent row of approximately twenty-two inches is ideal for crop cultivation and subsequent harvesting.

Figure 3:
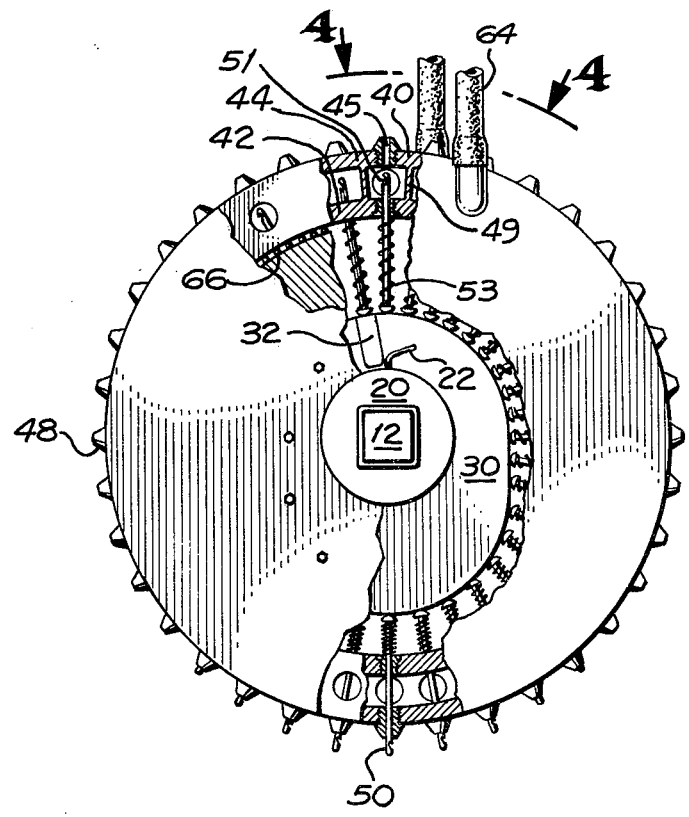
FIG. 3 is a side elevational view of a typical embodiment of the present invention with portions shown partially broken away.

An annular cam 30 is disposed around the wheel hub and extends radially outwardly from the wheel hub. The annular cam has a radially extending opening closable by a cam dowel 32. The dowel enables the removal or replacement of any of the plurality of seed holders 50 from the rotatable seed box 40 when the outer plates 60, 61 have been removed as will be discussed more fully below. With reference to FIG. 3, the annular cam is characterized as having its cam lobe generally disposed downwardly from the planter bar toward the ground. In this manner, as the seed box rotates around the wheel hub and the cam, the plurality of seed holders are urged outwardly from the seed box and into ground engagement generally around the point where the seed box engages the ground. In the preferred embodiment, the annular cam and wheel hub are integrally constructed from metal such as steel or the like.

A seed box 40 is rotatable around the wheel hub and the cam and engages the ground as the frame and planter bar are drawn over the ground. The seed box essentially comprises inner and outer concentric rings 42, 44 (see FIG. 3) respectively, spaced apart from each other by typically four inches. The rings are held spaced apart by side members 46, 47 extending between the rings and rigidly secured thereto. The seed box carries a plurality of ground penetrating seed holder guides 48 threadably secured to the outer ring and extending circumferentially around and above the outer ring. Each seed holder guide has an opening 45 through which a seed holder is urgeable as the seed box rotates around the wheel hub and the cam. The seed holders guides act to maintain the seeds to be planted in the seed holders until the seed holders penetrate the ground and deposit the seeds in the ground as will be discussed more fully below. A felt washer or a similar seal means (not shown) within and around the opening ensures dirt particles or the like will not enter the seed box as the seed holder extends within the seed box to obtain a seed to be planted. The spacing between adjacent seed holder guides is typically from between two inches to two and one-half inches. Each seed holder is characterized as having a truncated conical shape, although it is to be understood that different shapes may be utilized to practice the teachings of the present invention. With reference to FIG. 3, in an alternate embodiment, the seed box includes a plurality of radially extending wall members 49 disposed between adjacent seed holders and between adjacent openings in the side members of the seed box as will be discussed. The wall members extend across the width of the seed box to define a plurality of seed compartments within the seed box for each seed holder. The seed box inner and outer concentric rings and the side members are constructed from plastic, such as teflon or the like. The seed holder guides are constructed from either plastic or metal such as steel.

The seed box carries a plurality of seed holders 50 each being in slidable contact on and around the cam. Each seed holder extends within the seed box for obtaining a seed to be planted, and is urgeable out of the seed box through the seed holder guides for penetrating the ground and depositing the seed in the ground as the seed box rotates around the wheel hub and the cam. Each seed holder has a spoon-shaped opening 51 disposed at the end of the seed holder enabling the seed holder to obtain a seed for subsequent planting in the ground when the seed holder is disposed within the seed box. Each seed holder is replaceable by like seed holders having different sized openings 51 and different lengths permitting the seed holders to obtain different sized seed to be planted for different types of crops as well as to plant the seeds to a precise depth within the ground. For example, referring to the sugar beet example above, it has been found that sugar beet seeds are ideally planted to a depth of approximately one inch. Therefore by selecting the appropriate length of seed holder, the spoon-shaped opening can be made to extend about one inch outwardly from the seed holder guides when the seed holder is on the cam lobe. It should be noted that a crank means (not shown) generally located at the forward end of the frame may be utilized to tilt the frame with respect to the ground to control the planting depth typically to within one quarter of an inch. A spring 53 disposed around each seed holder and between the cam and the inner ring, urges the seed holder to a normal position or a position of rest within the seed box. In an alternate embodimment of the present invention, the seed holder is of a hollow construction and is in communication with a supply of compressed gas (not shown). In this manner, when the seed holder is fully extended as it penetrates the ground (see FIG. 3) the supply of compressed gas may be activated to ensure the seed is dislodged from the spoon-shaped opening and into the ground. The supply of compressed gas also acts to ensure the seed holder does not become clogged or in any other way rendered inoperable due to dirt particles or the like being lodged within the spoon-shaped opening. In this alternate embodiment, a ring (not shown) having a plurality of gently sloped cam surfaces therearound may be placed over the cam to ensure a seed holder does not continually activate the supply of compressed gas when the present invention is raised from ground engagement. By selecting an appropriate compressed gas, such as an anhydrous gas or the like, it may be possible to stimulate the growth of the seed by injecting the gas around the seed as the seed is urged from the seed holder and into the ground. In the preferred embodiment, the seed holder and spring are typically constructed from a metal such as steel, with the end of the seed holder having the spoon-shaped opening being made from a hardened metal.

The present invention further includes a means of supplying seed to the seed box as the seed box rotates around the wheel hub and the cam. The means of supplying seed generally comprises a plurality of outer plates 60, 61 abutting opposite sides of the seed box and secured to the wheel hub by a plurality of bolts 62 and a circular disc 63 rigidly attached to the wheel hub and the cam. The circular disc 63 also provides a circular raceway enabling the seed box to freely rotate around the wheel hub and the cam. A seed tube 64 is carried by one of the outer plates, for example, outer plate 60, and is in communication with a source of seed (not shown). A plurality of seed tube openings 65 are disposed around the periphery of the seed box and extend through the side member 46 of the seed box abutting the outer plate 60 carrying the seed tube. These openings are in rotatable alignment with the seed tube such that when each of the openings is aligned with the seed tube, the seed is communicated from the source of the seed through the seed tube and the opening into the seed box. To ensure the seed box easily rotates around the wheel hub, the circular disc 63 carries a plurality of ball bearings 66 disposed between the disc and the seed box. In an alternate embodiment, the disc contains a surface abutting the seed box constructed from a low friction material such as teflon or the like. The outer plates in conjunction with the wheel hub typically define an apparatus for planting seed having a diameter of from between eighteen to twenty four inches. The outer plates and circular disc are each constructed from metal such as steel.

Figure 4:
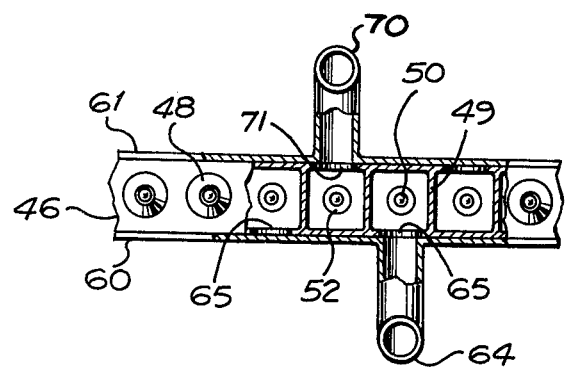
FIG. 4 is a top view of a typical embodiment of the present invention with portions shown broken away.

In an alternate embodiment, as perhaps best shown in FIG. 4, the present invention includes a means supplying fertilizer seed to the seed box. This means generally comprises a fertilizer tube 70 carried by the other of the outer plates, for example, outer plate 61, with the fertilizer tube being in communication with a source of fertilizer seed (not shown). In like manner, a plurality of fertilizer tube openings 71 are disposed around the periphery of the seed box and extend through the side member 47 of the seed box abutting the outer plate carrying the fertilizer tube. Each fertilizer tube opening is in rotatable alignment with the fertilizer tube such that when each of the openings is aligned with the fertilizer tube, fertilizer seed is communicated from the source of fertilizer seed through the fertilizer tube and the fertilizer tube opening into the seed box. A plurality of tube covers (not shown) is closably insertable in either the fertilizer tube or seed tube openings, 71 or 65, respectively, on either side of the seed box side members 47, 46 such that when a tube opening on one side of a seed box is closed, the tube opening on the other side of the seed box member is open. In this manner, it is possible to provide a seed box having seed compartments filled alternately with crop seed and fertilizer seed. Thereafter, as the seed box engages the ground and the seed holders penetrate the ground, the present invention alternately dispenses seed and fertilizer in the ground.

I claim:

1. An apparatus for planting seed comprising:
    (a) a wheel hub having a cam therearound;
    (b) a ground engaging seed box having plural seed compartments therein, with the seed box being spaced apart from the cam and rotatable around the cam;
    (c) a plurality of seed holders carried by the seed box slidable around the cam, with each seed holder extending within a seed compartment to obtain seed to be planted, and being urgeable out of the seed compartment to penetrate the ground and deposit the seed in the ground as the seed box rotates around the cam;
    (d) means supplying fertilizer seed and crop seed to the seed box as the seed box rotates around the cam comprising:
        (i) a first outer plate being secured to the wheel hub and abutting one side of the seed box;
        (ii) a crop seed tube extending through the first outer plate and in communication with a supply of crop seed;
        (iii) plural crop seed tube openings disposed around the periphery of the seed box between the seed box and the first outer plate, with each opening extending within a seed compartment and aligned with the seed tube when the seed box rotates such that when each seed tube opening is aligned with the seed tube, crop seed is communicated into the seed compartment;
        (iv) a second outer plate being secured to the wheel hub and abutting the other side of the seed box;
        (v) a fertilizer tube extending through the second outer plate and in communication with a supply of fertilizer seed; and,
        (vi) plural fertilizer tube openings disposed around the periphery of the seed box between the seed box and the second outer plate, with each opening extending within a seed compartment and aligned with the fertilizer tube when the seed box rotates such that when each fertilizer tube opening is aligned with the fertilizer tube, fertilizer seed is communicated into a seed compartment.

2. The apparatus of claim 1, wherein each seed compartment is formed from wall members extending radially outwardly away from the wheel hub between adjacent seed holders, the wall members defining alternating fertilizer seed and crop seed compartments for adjacent seed holders.

3. The apparatus for claim 1, further including a closeable radially extending slot disposed in the cam for removing a seed holder from the seed box.

4. The apparatus of claim 1, wherein the seed box carries a ground penetrating seed holder guide for each seed holder, each ground penetrating guide keeping the seed within the seed holder until the holder penetrates the ground.

5. An apparatus for planting seed attachable to a planter bar of the type carried by a frame movable over the ground, the apparatus comprising:
    (a) a wheel hub slidably attachable to the planter bar having a cam therearound;
    (b) a ground engaging seed box having plural seed compartments therein, with the seed box being spaced apart from the cam and rotatable around the cam;
    (c) a plurality of seed holders carried by the seed box slidable around the cam, with each seed holder extending within a seed compartment to obtain seed to be planted, and being urgeable out of the seed compartment to penetrate the ground and deposit the seed in the ground as the seed box rotates around the cam;
    (d) means supplying fertilizer seed and crop seed to the seed box as the seed box rotates around the cam, comprising:
        (i) a first outer plate being secured to the wheel hub and abutting one side of the seed box;
        (ii) a crop seed tube extending through the first outer plate and in communication with a supply of crop seed;

(iii) plural crop seed tube openings disposed around the periphery of the seed box between the seed box and the first outer plate, with each opening extending within a seed compartment and aligned with the seed tube when the seed box rotates such that when each seed tube opening is aligned with the seed tube, crop seed is communicated into the seed compartment;

(iv) a second outer plate being secured to the wheel hub and abutting the other side of the seed box;

(v) a fertilizer tube extending through the second outer plate and in communication with a supply of fertilizer seed; and, (vi) plural fertilizer tube openings disposed around the periphery of the seed box between the seed box and the second outer plate, with each opening extending within a seed compartment and aligned with the fertilizer tube when the seed box rotates such that when each fertilizer tube opening is aligned with the fertilizer tube, fertilizer seed is commmunicated into a seed compartment.

6. The apparatus of claim 5, wherein each seed compartment is formed from wall members extending radially outwardly away from the wheel hub between adjacent seed holders, the wall members defining alternating fertilizer seed and crop seed compartments for adjacent seed holders.

7. The apparatus of claim 5, further including a closeable radially extending slot disposed in the cam for removing a seed holder from the seed box.

8. The apparatus of claim 5, wherein the seed box carries a ground penetrating seed holder guide for each seed holder, each ground penetrating guide keeping the seed within the seed holder until the holder penetrates the ground.

* * * * *

UNITED STATES PATENT OFFICE
CERTIFICATE OF CORRECTION

Patent No. 4,261,270          Dated April 14, 1981

Inventor(s) William K. Nichols

It is certified that error appears in the above-identified patent and that said Letters Patent are hereby corrected as shown below:

In the specification:

Column 5, line 10, change "member" to --members--.

Column 5, line 10, after "46" insert --, 47--.

Column 5, line 47, after "box" insert --member--.

Signed and Sealed this

Fourteenth Day of July 1981

[SEAL]

Attest:

GERALD J. MOSSINGHOFF

Attesting Officer    Commissioner of Patents and Trademarks